US006574000B1

(12) United States Patent
Sansone

(10) Patent No.: US 6,574,000 B1
(45) Date of Patent: Jun. 3, 2003

(54) SYSTEM FOR THE ENHANCEMENT OF INFORMATION BASED INDICIA AND POSTAGE SECURITY DEVICES

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 936 days.

(21) Appl. No.: 08/753,236

(22) Filed: Nov. 22, 1996

(51) Int. Cl.7 ................................................ G06F 15/00

(52) U.S. Cl. .......................................... 358/1.1; 358/1.5

(58) Field of Search ................................ 209/584, 583; 395/101, 105, 113, 117; 382/101, 182; 283/79, 72

(56) References Cited

U.S. PATENT DOCUMENTS

| | | | | | |
|---|---|---|---|---|---|
| 4,106,060 | A | * | 8/1978 | Chapman, Jr. | 358/402 |
| 4,835,713 | A | | 5/1989 | Pastor | 364/519 |
| 4,868,757 | A | | 9/1989 | Gil | 364/464.03 |
| 4,934,846 | A | * | 6/1990 | Gilham | 400/104 |
| 4,955,290 | A | * | 9/1990 | Kipphan et al. | 101/183 |
| 5,005,995 | A | * | 4/1991 | Bruns et al. | 400/144.2 |
| 5,118,369 | A | | 6/1992 | Shamir | 156/64 |
| 5,151,684 | A | * | 9/1992 | Johnsen | 340/572 |
| 5,186,498 | A | * | 2/1993 | Dietrich | 283/67 |
| 5,480,239 | A | | 1/1996 | Kim et al. | 400/120.09 |
| 5,489,767 | A | * | 2/1996 | Billington | 235/437 |
| 5,543,177 | A | * | 8/1996 | Morrison et al. | 427/288 |
| 5,550,958 | A | | 8/1996 | Hattori | 395/115 |
| 5,557,742 | A | * | 9/1996 | Smaha et al. | 395/186 |
| 5,572,010 | A | | 11/1996 | Petrie | 235/494 |
| 5,655,023 | A | * | 8/1997 | Cordery et al. | 380/51 |
| 5,712,921 | A | * | 1/1998 | Zabele | 382/112 |
| 5,774,146 | A | * | 6/1998 | Mizutani | 347/43 |
| 5,780,778 | A | * | 7/1998 | Schwartz et al. | 177/25.13 |

FOREIGN PATENT DOCUMENTS

| | | | | |
|---|---|---|---|---|
| EP | 0 424 728 | A2 | 10/1990 | B07C/3/00 |

OTHER PUBLICATIONS

Introduction and Background, "Information Based Indicia Program (IBIP) Indicia Specification: Draft Document" XP–002137735 dated Jun. 13, 1995.

Xerox Announces Software Kit for Creating Working Documents with Dataglyphs, Nov. 6, 1995.

USPS, Information Based Indicia program Postal Security Device Specification, Jun. 13, 1996.

* cited by examiner

*Primary Examiner*—Gabriel Garcia
(74) *Attorney, Agent, or Firm*—Ronald Reichman; Angelo N. Chaclas

(57) ABSTRACT

A system that supplies permanent and human and machine readable evidence that a approved printer was used to print the indicia affixed to a mail piece. The system will first capture the postal customer's or mailers printer type and configuration setting information, paper, ink, or toner combination and then use the foregoing information to enable printing of the Information-Based Indicia, if the active printer going to print the indicia is found on a stored (local or remote) "Information-Based Indicia Approved Printer's List". Then the system will add this same printer information to the USPS defined Information-Based Indicia print field format so as to provide evidence that an approved printer was used. The foregoing printer information may be printed in a coded form on the Information-Based Indicia to automate the sortation of indicium that can not be read.

21 Claims, 9 Drawing Sheets

SYSTEM FOR THE ENHANCEMENT OF INFORMATION BASED INDICIA AND POSTAGE SECURITY DEVICES

FIELD OF THE INVENTION

The invention relates generally to the field of franking machines and more particularly to the printing of specific type of indicia.

BACKGROUND OF THE INVENTION

Historically postage meters have been mechanical and electromechanical devices that: maintain through mechanical or "electronic registers" (postal security devices) an account of all postage printed and the remaining balance of prepaid postage; and print postage postmarks (indicia) that are accepted by the postal service as evidence of the prepayment of postage.

Soon small business mailers may be able to use their desktop computer and printer to apply postage directly onto envelopes or labels while applying a address. The United States Postal Service Engineering Center recently published a notice of proposed specification that may accomplish the foregoing. The title of the specification is Information Based Indicia Program Postal Security Device Specification, dated Jun. 13, 1996. The Information Based Indicia Program specification includes both proposed specifications for the new indicium and proposed specifications for a postal security device (PSD). The proposed Information-Based Indicia (IBI) consists of a two dimensional bar code containing hundreds of bytes of information about the mail piece and certain human-readable information. The indicium includes a digital signature to preclude the forgery of indicia by unauthorized parties. The postal security device is a unique security device that provides a cryptographic digital signature to the indicum and performs the function of postage meter registers.

There are approximately one and a half million postage meters in use in the United States accounting for about twenty billion dollars of postage revenue annually. The United States Postal Service (USPS) is authorized to regulate the manufacture and use of postage meters. For the past several years the United States Postal Service has been actively proposing a solution to the problem of inadequate postage meter security. The United States Postal Service is also trying to solve the problem that currently available postal meter indicia are susceptible to counterfeiting. The United States Postal Service plans to solve the above problems by decertifying mechanical meters and implementing the Information-Based Indicia Program (IBIP).

The IBIP is a United States Postal Service initiative supporting the development and implementation of a new form of postal indicia. The IBIP specification is intended to address the counterfeiting threat. An IBIP indicium substitutes for a postage stamp or as a postage meter. imprint as evidence of the fact that postage has been paid on mail pieces. The postal security device (PSD) is expected to be a hardware component for use with either a computer based or postage meter based host system. Each PSD will be a unique security device. The PSD core security functions are cryptographic digital signature generation and verification and secure management of the registers that track the remaining amount of money available indicium creation i.e., descending register and the total postage value used by the PSD i.e., ascending register. The PSD will be a tamper-resistant device that may contain an internal random number generator, various storage registers, a date/time clock and other circuits necessary to perform the foregoing functions. The PSD will comply with Federal Information Processing Standard (FIPS) 140-1 published by the United States Department Of Commerce, National Bureau of Standards, and will be validated through the National Institute of Standards (NIST) Computer Systems Laboratory's Cryptographic Module Validation Program.

The Information-Based Indicia technology of the United States Postal Service offers the postal customer a way to pay for postage without stamps. Envelopes are franked using the postal customer's personal computer, a personal computer compatible add on and the customer's printer. The PSD provides postal value storage and the link to the USPS and the manufacturer of the personal computer compatible add on.

Recent studies have shown that the code format tolerances promulgated in the IBIP specification can only be met by some of the available printers. Both resolution (dots/inch) and positional accuracy seem to be the major limiting factors. Furthermore, the printing technology used is yet another major factor, specifically when combined with the type of paper used to form the envelope. Current estimates suggest that 2–3% of the IBIP indicium that are affixed to mail pieces will not be able to be read due to the use of incorrect printers, defective printers or improper envelopes. It is estimated that another 1–2% of the IBIP indicium that are affixed to mail pieces will not be able to be read due to damage done to the coded message.

The USPS plans to bill mail that contains an Information-Based Indicia that can not be read by automated equipment to the Information-Based module provider unless the provider can show that the inability to read the indicia was caused by mailer or was a Post Office error. It is estimated that it will cost approximately $15.00 to manually process and return each mail piece that contains an Information-Based Indicia that can not be read. The entire USPS IBIP program may fail because of the cost to manually process and return each mail piece that contains an indicium that can not be read. Thus, a problem with the prior art is that the cost to implement the processing and returning of indicium that can not be read could remove the benefit to the USPS and the Information-Based Indicia module provider.

SUMMARY OF THE INVENTION

This invention overcomes the disadvantages of the prior art by providing a system that will supply permanent and human and machine readable evidence that a approved printer or unapproved printer was used to print the indicia in question. The system will first capture the postal customer's or mailers printer type and configuration setting information, paper, ink, or toner combination and then use the foregoing information to enable printing of the Information-Based Indicia if the active printer going to print the indicia is found on a stored (local or remote) "Information-Based Indicia Approved Printer's List". Then the system will add this same printer information to the USPS defined Information-Based Indicia print field format so as to provide evidence that an approved printer or unapproved printer or proper supplies were used. The foregoing printer information may be printed in a coded form on the Information-Based Indicia to automate the sortation of indicium that can not be read. Thus, this invention will improve the processing of Information-Based Indicia mail by reducing and eventually virtually eliminating the use of printers, printer settings, paper envelopes, inks and toners that can not be read by Information-Based Indicia scanners. Hence, this invention will improve the processing of mail.

The foregoing is accomplished by collecting information about the indicia printer, the indicia printer settings, the paper on which the indicia is going to be printed and the ink or toner that is going to be used to print the indicia, using the program contained in the user computer. Then the program contained in the user computer decides if the printer, paper, ink, or toner combination is approved by the USPS to allow printing. At this point the program contained in the user computer notifies the user of the status of the selected printer, paper and ink, or toner. Now, the program contained in the Postal Security Device computer adds the coded representation of the selected printer, paper and ink or toner to the indicia to automate the post processing of mail pieces that have indicia that can not be read.

DETAILED DESCRIPTION OF THE PREFERRED EMBODIMENT

Figure 1:
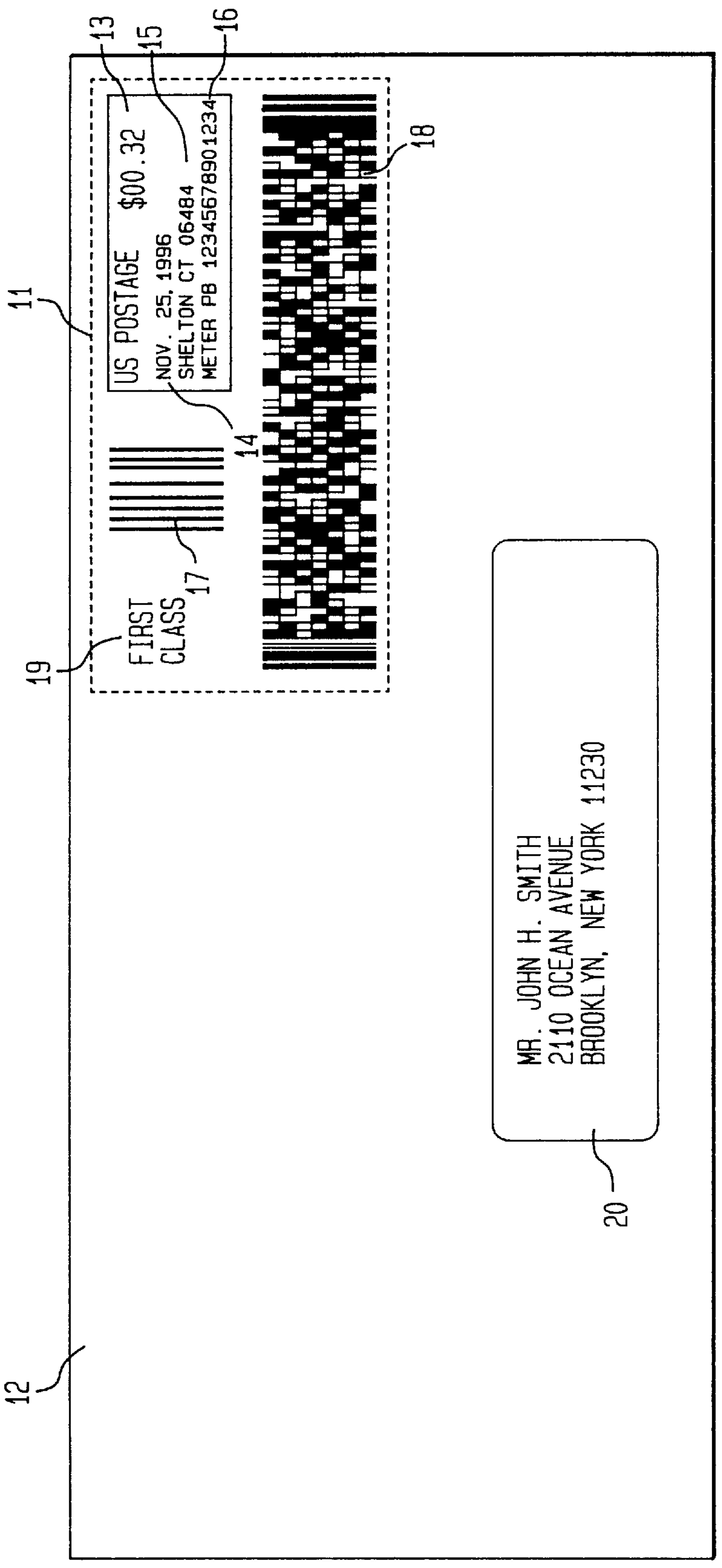
FIG. 1 is a drawing of a prior art mail piece containing a Information Based Indicia.

Referring now to the drawings in detail, and more particularly to FIG. 1, the reference character 11 represents a USPS Information-Based Indicia that was printed on mail piece 12 by a printer. The postal indicia 11 contains a dollar amount 13, the date 14 that the postal indicia was affixed to the mail piece, the place the mail piece was mailed from 15, the postal meter serial number 16, a FIM code 17 and a 2D encrypted bar code 18. Mail piece 12 also contains an indication 19 of the class of mail piece 12. Mail piece 12 is going to be sent to the person and place indicated in address field 20.

Figure 2:
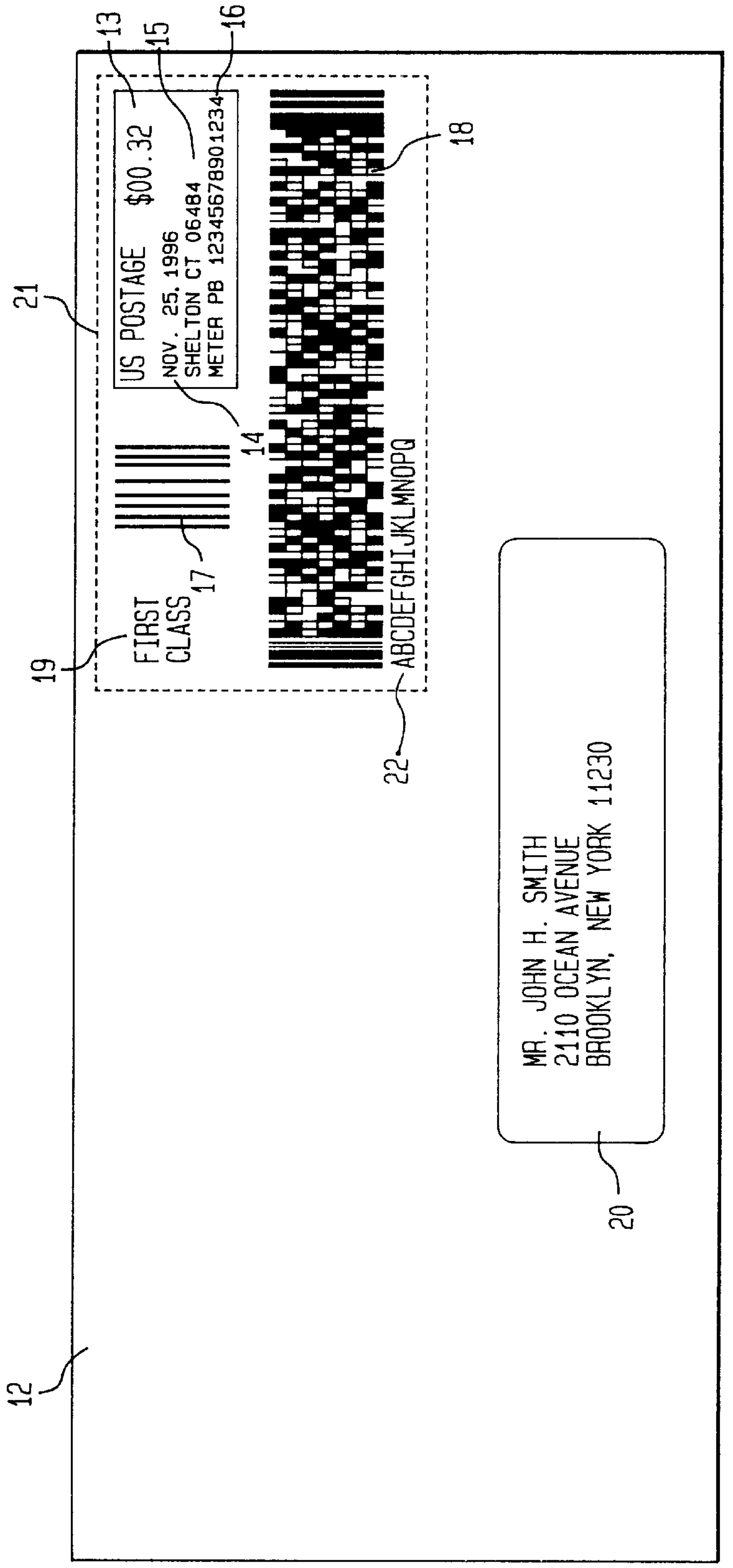
FIG. 2 is a drawing of a Information-Based Indicia containing a code that represents the printer, printer settings, ink, or toner and paper in which the indicia was printed.

FIG. 2 is a drawing of a Information-Based Indicia containing a code that represents the printer, printer settings, ink, or toner and paper in which the indicia was printed. The postal indicia 20 contains a dollar amount 13, the date 14 that the postal indicia was affixed to the mail piece, the place the mail piece was mailed from 15, the postal meter serial number 16, a FIM code 17 and a 2D encrypted bar code 18. Mail piece 12 is going to be sent to the person and place indicated in address field 20.

Postal indicia 21 has a human readable or machine readable code 22 that represents the postal customer's or mailers printer type and configuration setting information, paper, ink, or toner combination. Code 22 may be of the form A, B, C, D, E, F, G, H, I, J, K, L, M, N, O, P and Q. Where, the positions held by letters A and B may be used to represent the manufacturer of the printer that printed indicia 21 and the positions held by letters C, D, and E may be used to represent the model of the printer that printed indicia 21. The position held by letter E may be used to represent the print density of the printer that printed indicia 21 and the position held by letter F may be used to represent the print dither type of the printer that printed indicia 21. The position held by letters G and H may be used to represent the envelope size of the envelope in which indicia 21 was affixed and the position held by letters I and J may be used to represent the paper type in which indicia 21 to was affixed. The position held by letters K, L and M may be used to represent the type of ink that was used to print indicia 21 and the position held by letters N, O and P may be used to represent the toner type in which indicia 21 was affixed. Letter Q may be used as a control or for error correction.

It will be obvious to one skilled in the art that code 22 may have additional positions in order to represent additional information about the printer that printed indicia 21. It will also be obvious to one skilled in the art that code 22 may be printed in decimal, base 32, numerical, alphanumerical, bar code or other form.

Figure 3:
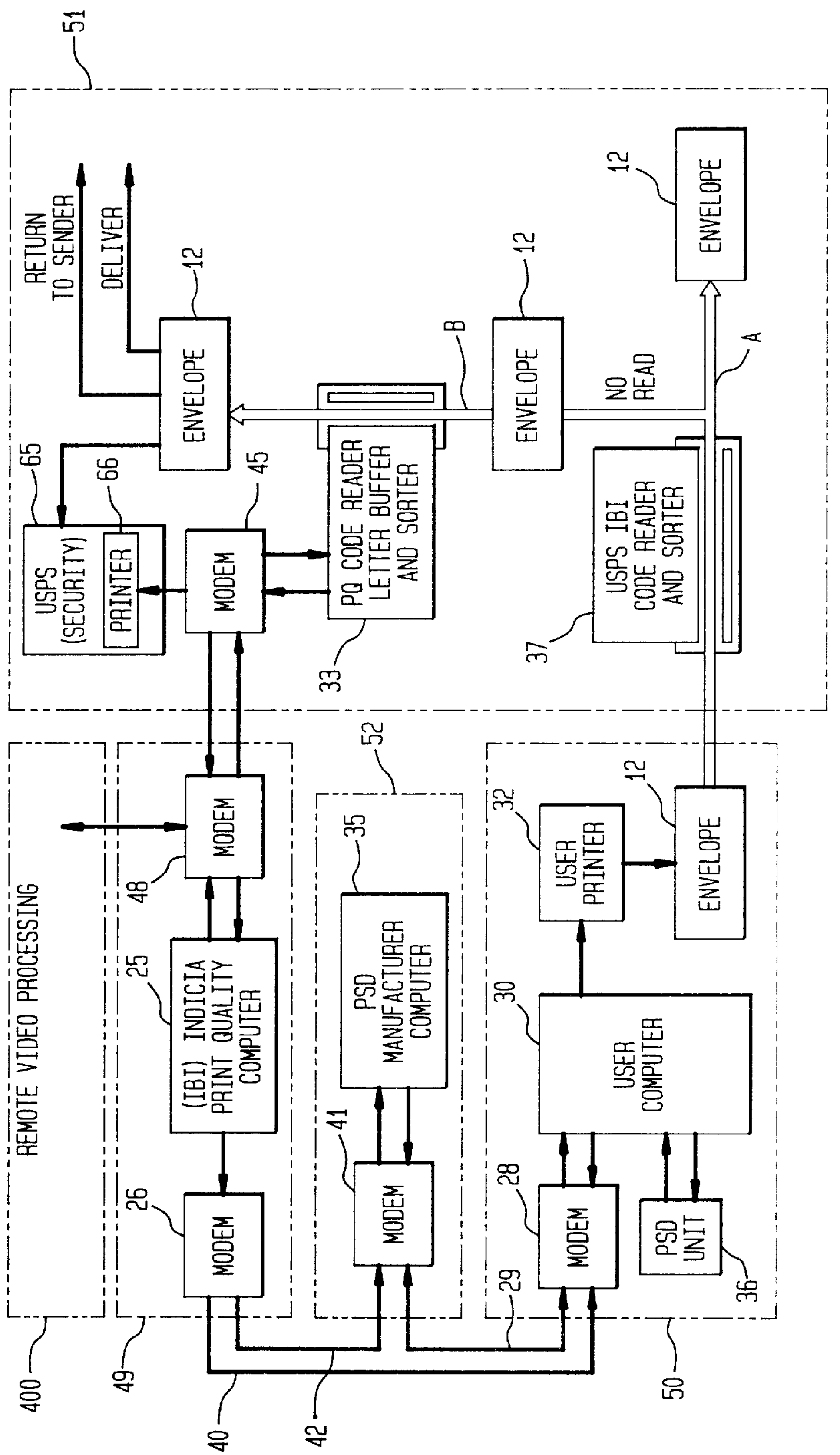
FIG. 3 is a block drawing of the system used to print information about the printer, printer settings, ink, or toner and paper in which the indicia was printed and the system used to read the above information.

FIG. 3 is a block drawing of the system used to print information about the printer, printer settings, ink, or toner and paper in which the indicia was printed and the system used to read the above information. Postal security device (PSD) 36 is coupled to user computer 30 and computer 30 is coupled to modem 28. Computer 30 is also coupled to user printer 32. Printer 32 s capable of printing an envelope 12 with an indicia 21 (shown in the description of FIG. 2) affixed thereto. Modem 28, computer 30, PSD 36, user printer 32 and envelope 12 may be found in the office of postal customer 50. Postal customer 50 will deposit envelope 12 in the mail. Envelope 12 will be read by USPS Information-Based Indicia code reader and sorter 37. If, Information-Based Indicia 21 can not be read by reader 37 then, envelope 12 will be read by postal quality reader 33. Reader 33 is coupled to modem 45 and modem 45 is coupled to modem 48. Modem 48 is coupled to Information-Based Indicia print quality computer 25. Modem 48 is also coupled to Remote Video processing 400. Computer 25 is coupled to modem 26. Modem 48, computer 25 and modem 26 may be found at the site of quality inspector 49. Sorter 37, reader 33, security station 65, printer 66, modem 45 and envelope 12 may be found at USPS site 51. Modem 26 is coupled to PSD manufacture modem 41 via communications path 42 and modem 26 is coupled to postal user modem 28 via communications path 40. Modem 41 is coupled to PSD manufacturer's computer 35. Modem 41 and computer 35 are at PSD manufacturer site 52. Modem 41 is coupled to modem 28 via communications path 29.

Information-Based Indicia print quality computer 25 stores in its memory information about the printers, printer settings, inks or toners and papers that have been approved by the USPS for the printing of indicia 21. Computer 25 transmits the aforementioned information to modem 26. Modem 26 transmits the above information to postal security device (PSD) manufacturer 35. A specification for a PSD is set forth in the USPS Information Based Indicia Program Postal Security Device Specification, dated Jun. 13, 1996, herein incorporated by reference. Computer 30 may receive information about the printers, printer settings, inks or toners and papers that have been approved by the USPS for the printing of indicia 21 from the manufacturer of postal security device 36. The aforementioned information may be sent to computer 30 by PSD computer 35 via modem 41 and 28 or by IBI computer 25 via modem 26 and 28. The above information may also be contained in a diskette or other memory storage device and then entered into the memory of computer 30.

Figure 4:
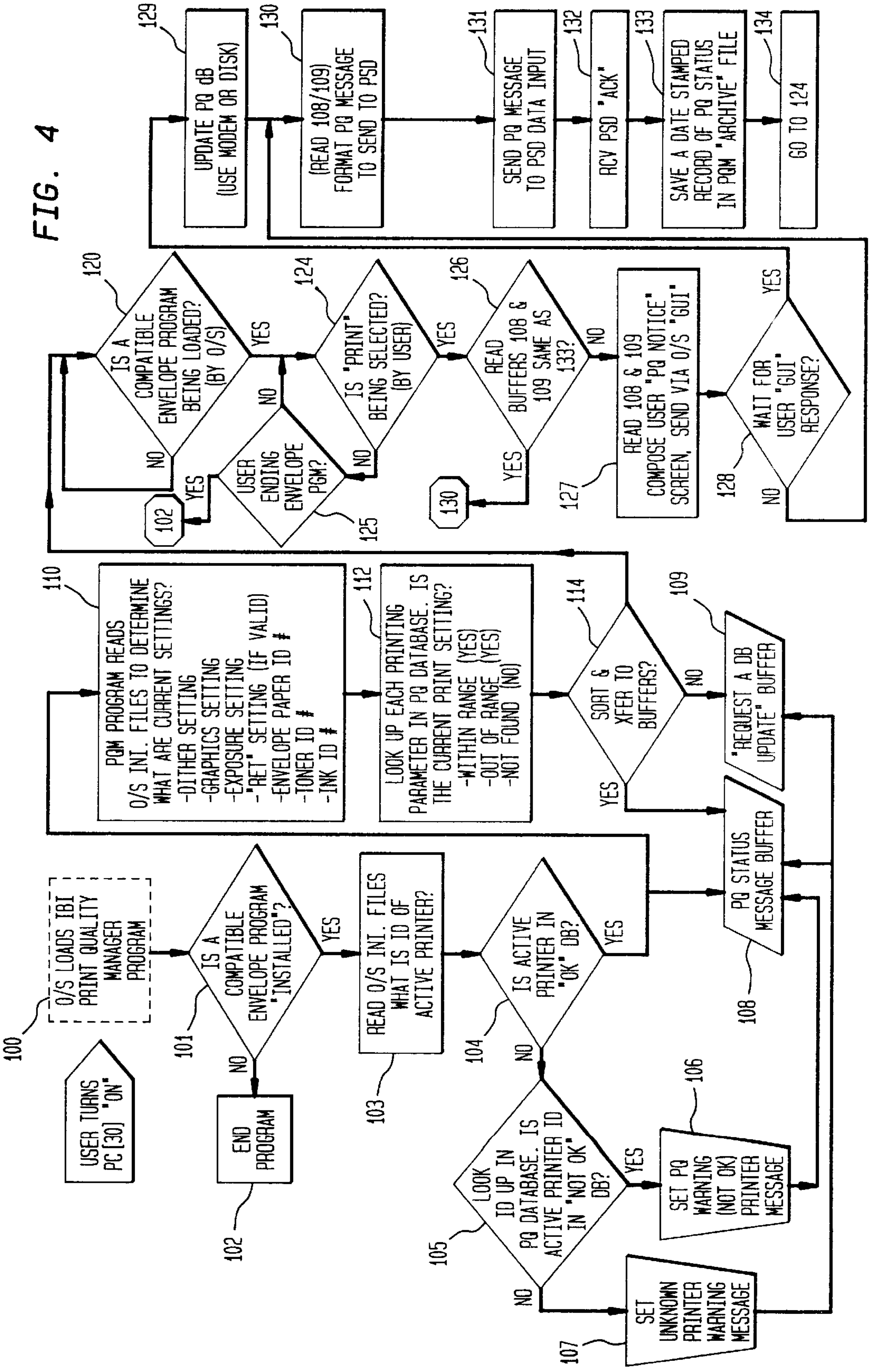
FIG. 4 is a drawing of a flow chart of the print quality manager program contained in user computer 30.

The operator of computer 30 will use the program described in the description of FIG. 4 to enter the printer, printer type, configuration setting information, paper, ink, or toner combination that is going to be used to print indicia 21. Computer 30 will inform the operator of computer 30, whether or not the printer type, configuration setting information, paper, ink, or toner combination selected to print indicia 21 has been approved by the USPS. Then, the operator of computer 30 will have the option to determine whether or not indicia 21 should or should not be printed. If, the operator of computer 30 determines that indicia 21 should be printed, the foregoing information will be used to print indicia 21. Computer 30 will transmit the foregoing information to printer 32. Printer 32 will then print indicia 21 on envelope 12. Indicia 21 will contain a code 22, described in the description of FIG. 2, that contains information regarding the printer type, configuration setting information, paper, ink, or toner combination selected to print indicia 21. At some later time envelope 12 will be mailed.

USPS Information-Based Indicia reader 37 at USPS site 51 will read indicia 21. If, code reader 37 is able to read indicia 21 on envelope 12, then envelope 12 will precede along path A and the USPS will deliver envelope 12 to the addressee. If, reader 37 is unable to read indicia 21, then and in that event envelope 12 will precede along path B and be scanned by reader 33. Reader 33 will read code 22. Code 22 provides evidence of the printer, printer type, configuration setting information, paper, ink, or toner combination that was used to print indicia 21. If, code 22 indicates that an improper printer, printer type, configuration setting information, paper, ink, or toner combination was used and envelope 12 was not damaged or printed correctly, envelope 12 may be returned to the mailer of envelope 12. The mailer of envelope 12 may be required to pay a fine to the USPS. The USPS may elect to notify the mailer of envelope 12, that indicia 21 is incorrect. This notification may be by ordinary mail or by transmitting the notification to computer 30 via Information-Based Indicia print quality computer 26, modem 26 and modem 28. The operator of computer 30 may inform the USPS to deliver envelope 12 and charge any fees to the owner of computer 30. The notification from computer 30 will be transmitted to computer 25 via modem 28, communications path 40 and modem 26. If, code 22 indicates that a proper printer, printer type, configuration setting information, paper, ink, or toner combination was used and envelope 12 was not damaged and indicia 21 was properly printed, envelope 12 will be returned to PSD manufacturer site 52. The manufacturer of the equipment used to print indicia 21 may be required to explain the reason for the inability to read indicia 21 or be required to pay a fine to the USPS. The notification to PSD manufacturer site 52 may be via modem 26, communications path 42 and modem 41.

In the event code 22 on envelope 12 can not be read by reader 33 a scan of envelope 12 will be transmitted to computer 25 via modem 45 and modem 48. Computer 25 and an operator at USPS Security Station 65 will determine whether or not code 22 was damaged or not correctly printed and whether or not envelope 12 may be delivered by the USPS. The foregoing process can be enabled by having printer 66 at Station 65 print information derived from information contained in computer 25.

FIG. 4 is a drawing of a flow chart of the print quality manager program contained in user computer 30. The user turns computer 30 on and in block 100 the operating system of computer 30 loads the print quality manager program into the memory of computer 30. Then the program goes to block 101 where computer 30 determines whether or not a compatible envelope program is installed in the memory of computer 30. A compatible envelope program may be the Dazzle Envelope Manager Software program manufactured by Dazzle of 247 High Street, Palo Alto, Calif. 94301-1041. If, a compatible envelope program is not installed in the memory of computer 30, the program would proceed to block 102 and end. If, a compatible envelope program was installed in the memory of computer 30 the program would advance to block 103 and the program would read its operating system initiating files and determine what is the identification of active user printer 32 (FIG. 3). Then the program would precede to decision block 104 and determine whether or not printer 32 is listed in the data base as a IBI approved printer. If, the answer to the aforementioned question is no, the program would go to decision block 105.

In decision block 105 the program would determine whether or not active printer 32 is listed in the data base as a printer that is not an IBI approved printer. If, it was determine that printer 32 was listed as a printer that was not IBI approved, then the program would go to block 106 and set a warning message that printer 32 is not an IBI approved printer. Then the program would store the above warning message in print quality status message buffer 108. If, decision block 105 determined that the answer was no, the program would advance to block 107. Block 107 would compose a warning message indicating that it does not know if printer 32 is an IBI approved printer. The aforementioned warning message composed in block 107 will be stored in block 108 status message buffer. At this point the program would proceed to block 109. Block 109 would be a buffer that would request an update on the status of printer 32. If, decision block 104 had a positive answer, this fact would be stored in print quality status message buffer 108.

At this point the program would advance to block 110 where the program would read the operating systems initiating files to determine what is the current dither setting, graphic setting, resolution enhancement technology setting (if valid), paper identification, toner identification and/or ink identification of printer 32. Then the program would go to block 112 and look up each print parameter read in block 111 in the print quality data base. The program would also determine in block 112 whether the current settings of printer 32 are within the IBI approved ranges, out of the current IBI ranges or not found. Now, the program would go to decision block 114, where the program would sort and transfer the information received from block 111 to the proper buffers. If, the information was not found, this fact would be stored in block 109 request update buffer. If, the settings were outside the IBI approved ranges the program would go to block 108 print quality message status buffer where this fact would be stored. If, the settings were within the IBI approved ranges the program would go to decision block 120. Decision block 120 would determine whether or not a compatible envelope program is being loaded. If, a compatible envelope program is not being loaded the program would go back to the input of block 120 and wait until a compatible envelope program is loaded. If, a compatible envelope program is being loaded, then the program would advance to block 124 to determine whether or not the user of computer 30 selected the print command. If, block 124 determines that the print command was not selected the program would go to decision block 125. Decision block 125 would determine whether or not the envelope program is going to be terminated by the user of computer 30. If, the envelope program is not going to be terminated then the program will go back to block 124. If, the envelope program is going to be terminated then the program will go to block 102 and the program will end. If, block 124 determines that the print command was selected the program would go to block 126 to read the contents of buffer 108 and buffer 109. Block 126 would use the aforementioned information that was read and compose a warning message that will appear on the display of computer 30.

At this juncture the program would advance to decision block 128 where the program would wait for the users response to the warnings. If, decision block 128 determines that the user of computer 30 wants to follow the warning message and/or messages the program would advance to block 129 where a request to update the print quality manger program may be made via modem 28 (FIG. 3) or diskette (not shown). If, decision block 128 determines that the user of computer 30 does not want to follow the warning message and/or messages the program would advance to block 130 where the program would read the information contained in buffer 108 and buffer 109 and format a print quality message. Then the program will go to block 131 where the aforementioned print quality message will be sent to the data input of PSD 36 (FIG. 3). Now the program will go to block 132 where PSD will acknowledge receipt of the aforementioned message. Then the program will go to block 133 where the program will save a date stamped record of the print quality message status in the print quality archives file. At this point the program would precede to block 134 and then go back to block 124.

Figure 5:
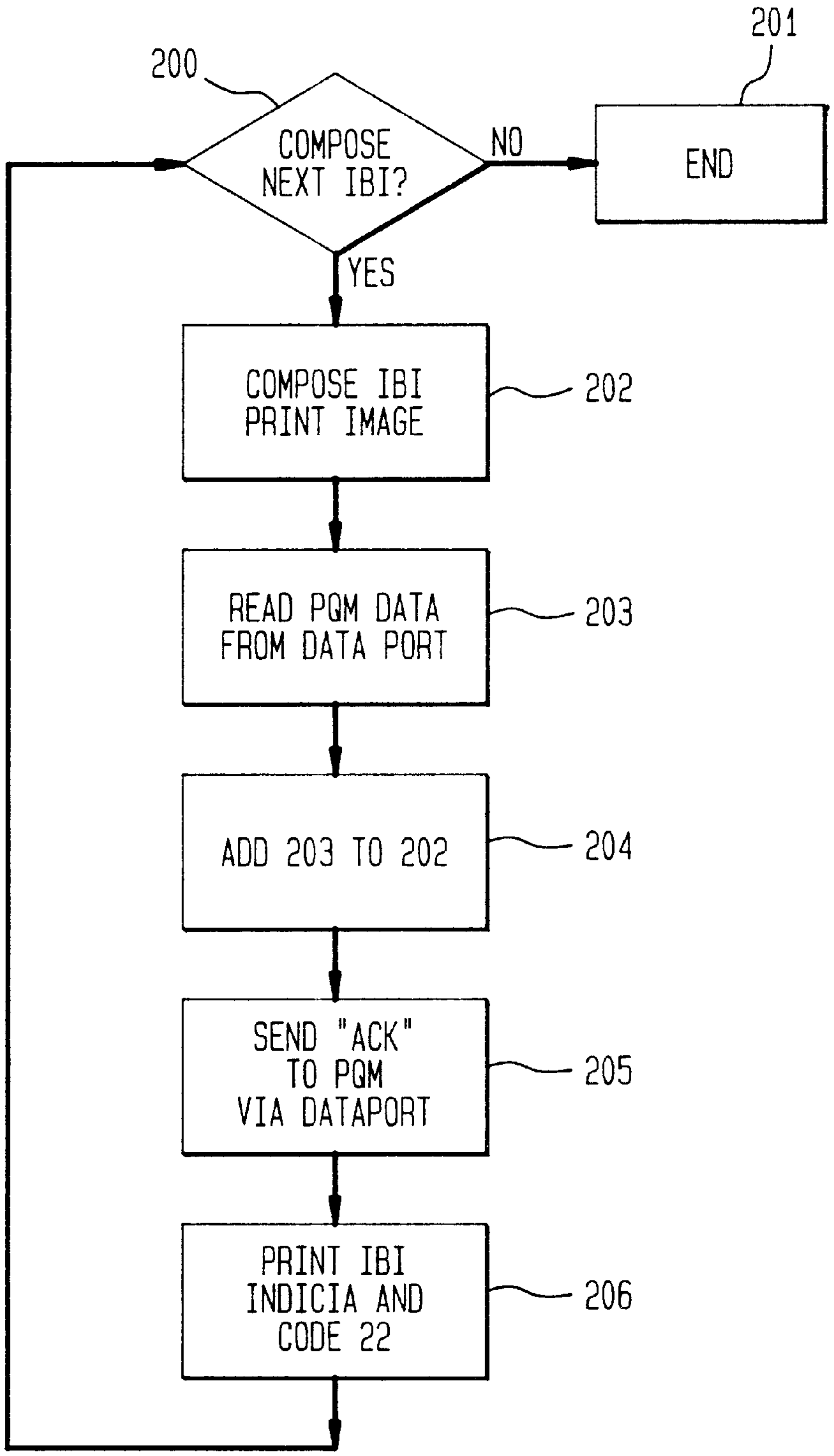
FIG. 5 is a drawing of a flow chart of the program that controls PSD 36 of FIG. 3, which is loaded into computer 30.

FIG. 5 is a drawing of a flow chart of the program that controls PSD 32 of FIG. 3, which is loaded into computer 30. The program begins in decision block 200, where the program determines whether or not the user of computer 30 (FIG. 3) wants to compose the next IBI indicia. If, block 200 determines that the user does not want to compose the next IBI indicia, then the program goes to block 201 where the program ends. If, block 200 determines that the user wants to compose the next IBI indicia, then the program goes to block 202 where the program composes an IBI indicia image. Then the program goes to block 203, where the program reads the information transmitted to the input of the data port of PSD 36 (FIG. 3). The information transmitted to the input of the data port of PSD 36 will be more fully described in the description of FIG. 6. Now the program goes to block 204 where the information read from the input of the data port of PSD 36 is added to the IBI indicia graphic image composed in block 202. Then the program goes to block 205 where the program sends an acknowledgment to the print quality manager program, described in the description of FIG. 4, that it added the aforementioned graphic image. Then the program goes to block 206 where the program informs computer 330 to request printer 32 to print an IBI indicia 21 containing a code 22. At this point the program goes back to decision block 200.

Figure 6:
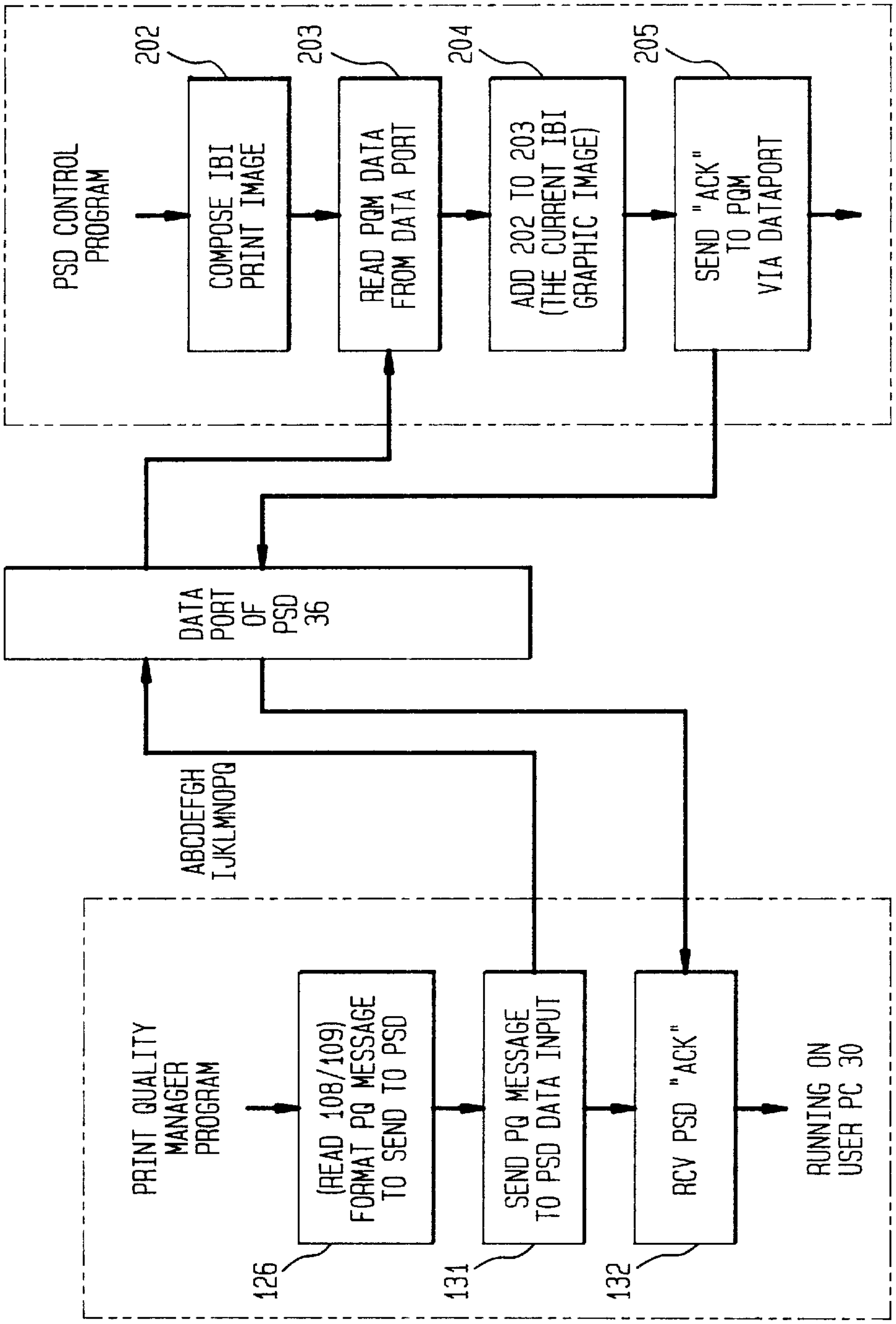
FIG. 6 is a drawing of a flow chart of the interaction of the print quality manager program of FIG. 4 with the program of FIG. 5 that controls PSD 36.

FIG. 6 is a drawing of a flow chart of the interaction of the print quality manager program of FIG. 4 with the program of FIG. 5 that controls PSD 36. The print quality warning message and/or messages formatted in block 126 i.e. code 22 will be sent to block 131. Block 131 will then send code 22, i.e. A, B, C, D, E, F, G, H, I, J, K, L, M, N, O, P, and Q to the data port of PSD 36. Block 203 will receive code 22 from the data port of PSD 36 and block 205 will acknowledge receipt of code 22 to the data port of PSD 36.

Figure 7:
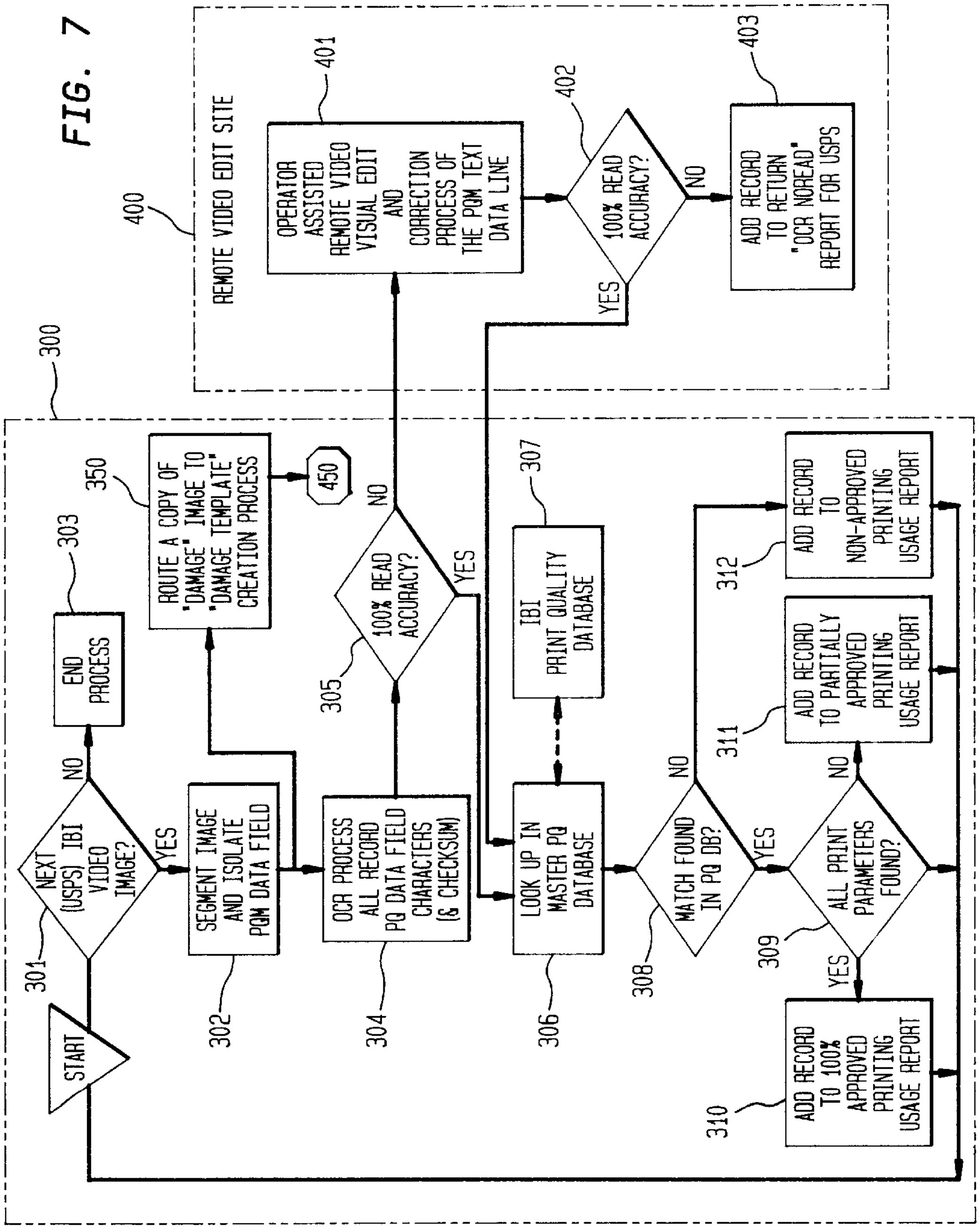
FIG. 7 is a drawing of a flow chart of the real time video image processor 300 and 400 process "no-read IBI indicia images so as to extract the print characteristics and to extract the "damage" image if there is one.

FIG. 7 is a drawing of a flow chart that shows how the real time video image processor 300 and 400 processes "no read" IBI indicia images so as to extract the print characteristics and to extract the "damage" image if there is one. The program begins at start and proceeds to decision block 301 next United States Postal service IBI video image. If, block 301 determines that there is no video image then the program proceeds to block 303 and the process is ended. If, block 301 determines that there is a video image then the program goes to block 302 segment image and isolate print quality manager data field. Then the program goes to block 320 to route a copy of the damaged image to the damaged template creation process. Then the program goes to block 450 damaged template database creation process. At this point, the program also goes to block 304 optical character recognition process all record print quality data field characters and checksum. Then the program proceeds to decision block 305 to determine whether or not the read accuracy was 100%. If, the read accuracy was less than 100% then the program proceeds to block 401 operator assisted remote video visual edit and correction process of the print quality manager text data line. Then the program proceeds to decision block 402 to determine whether or not it has 100% read accuracy. If block 402 determines that there was not 100% read accuracy then the program proceeds to block 403 to add the record to return the optical character recognition no read report for the United States Postal Service. If, block 402 determines that 100% read accuracy did exist then the program proceeds to block 306 to look up in the master print quality database. If, block 305 determined that the read accuracy was also 100% the program would also proceed to block 306 to look up in the master print quality database. Now the program would proceed to block 307 IBI print quality database to look up the relevant information. This information would be passed back to block 306 then the program would proceed to decision block 308 to determine whether or not a match was found in the print quality database. If, no match was found then the program would proceed to block 312 to add the record to the non approved printing usage report. If, a match was found in block 308 then the program would proceed to decision block 309 to determine whether or not all print parameters were found. If, all of the print parameters were not found then the program would proceed to block 311 to add the record to partially approved printing usage report. If, the program found all of the print parameters then the program would proceed to block 310 to add the record to the 100% approved printing usage report. After a decision was made in block 309 the program would proceed back to start.

Figure 8:
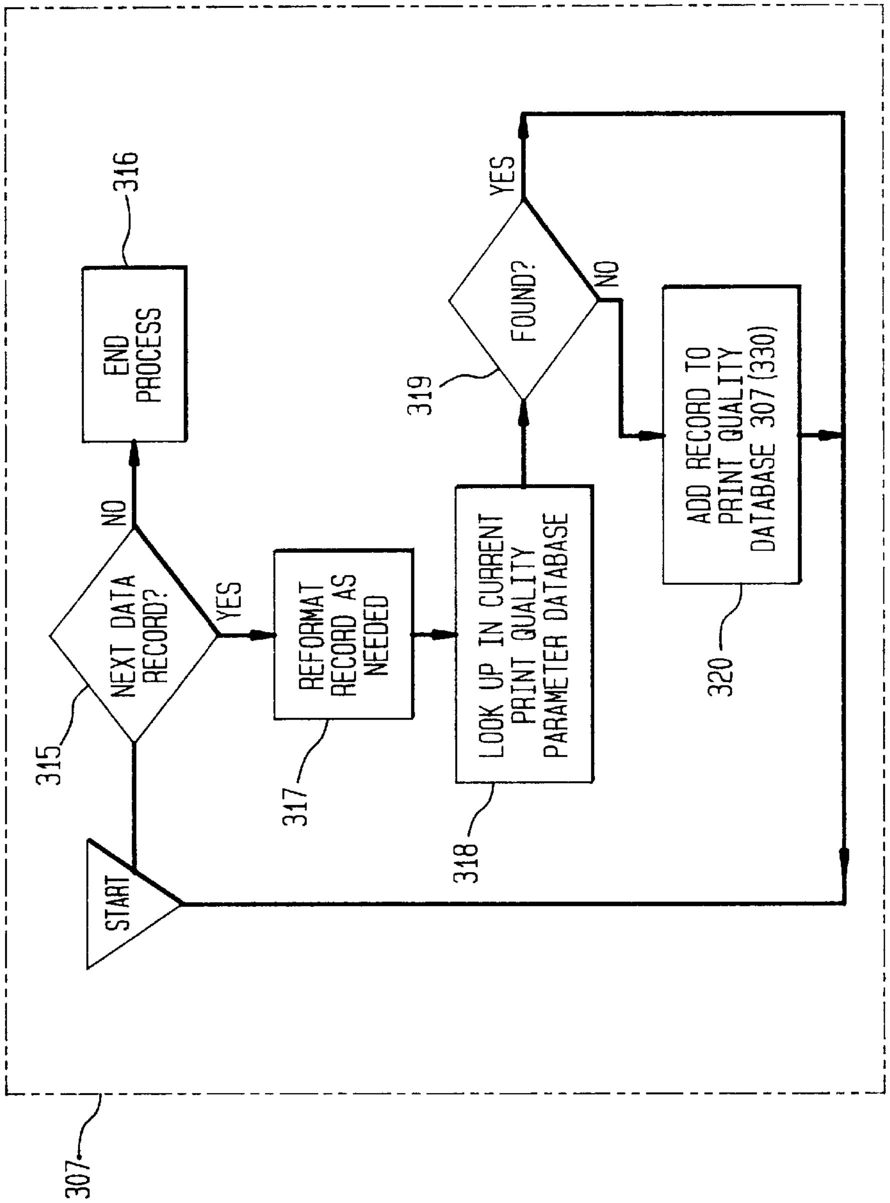
FIG. 8 is a drawing of a flow chart that shows how the print quality processor would update the printer, settings and supplies database.

FIG. 8 is a flow chart of a drawing that describes how the print quality database 307 would update the printer, settings and supplies database. The program would begin in decision block 315 next data record. Decision block 315 may contain records from the United States Postal Service that indicate successful IBI code reads and print quality manager data records. Block 315 may also contain data that indicates the manufacturers submission of testing results data and independent testing agencies data. If, no next data record is available in block 315 then the program would proceed to block 316 and the process would end. If, the next data record was found then the program would proceed to block 317 and reformat the record as needed. At this point the program would proceed to block 318 to look up in the current print quality parameter database. Then the program would proceed to decision block 319 to determine whether or not the requested information was found. If the requested information was not found then the program would proceed to block 320 to update the print quality database. Then the program would proceed to block 315 and wait for the next data record. If, block 319 determined that the record was found then the program would proceed back to decision block 315 and wait for the next data record.

Figure 9:
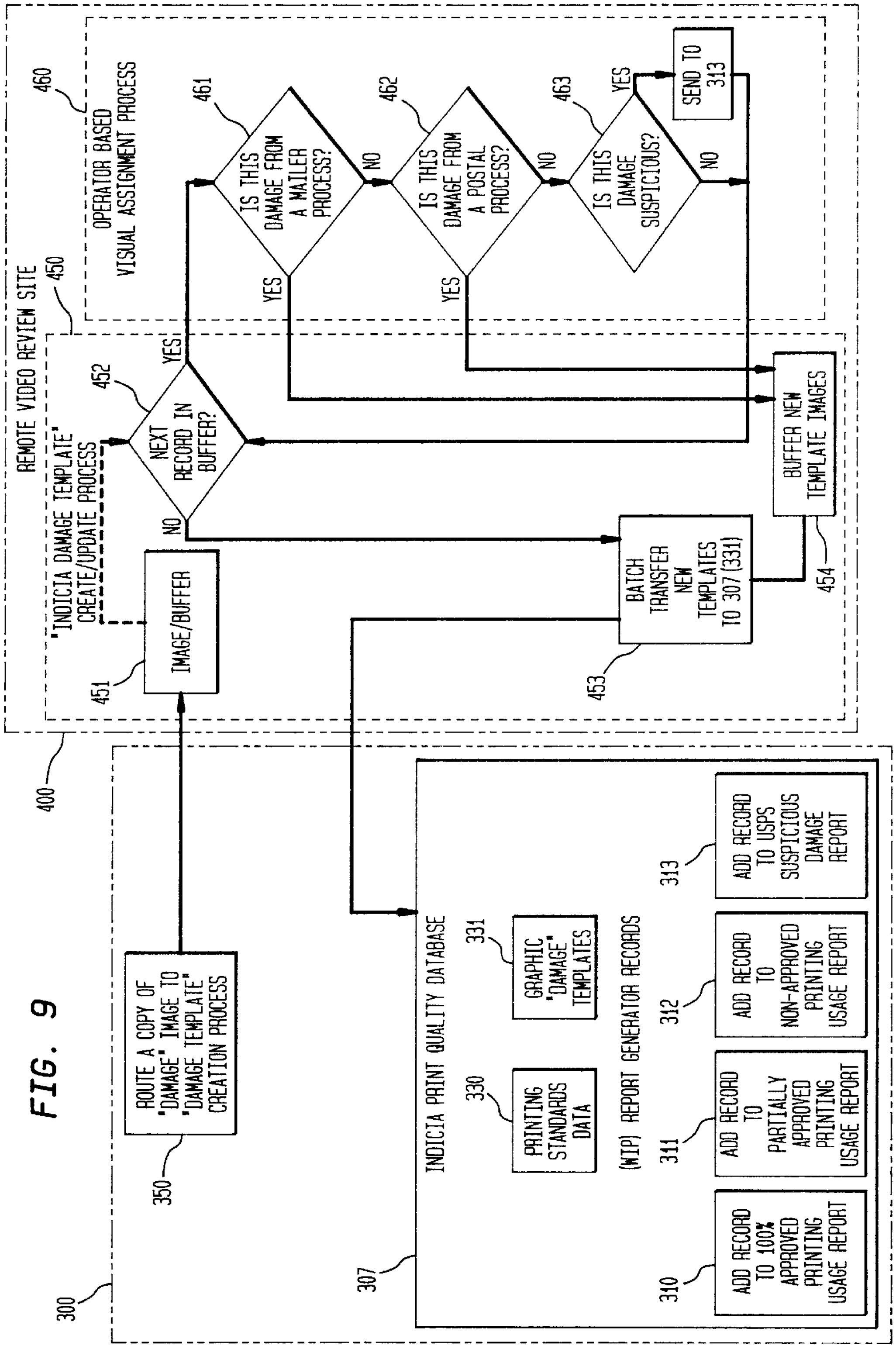
FIG. 9 is a drawing of a flow chart that shows how new "Damage Templates" are created and then added to the print quality data base.

FIG. 9 is a drawing of a flow chart that shows how new "damage templates" are created and then added to the print quality database. The program would begin from the output of block 350 that was shown in FIG. 7 route a copy of damaged image to damaged template creation process. Then the program would proceed to block 451 image buffer to route the image to operator. The program would precede to decision block 452 to determine whether or not a record is in image buffer 451. If, there is nothing in buffer 451 the program would go to 453 butch transfer, new templates, If, there is something in buffer 451 the program would go to decision block 461 to determine whether or not the damage is from a mailer process. If, the damage was from a mailer process then the program would proceed to block 454 buffer new template images. If, decision block 461 had a negative answer from the operator then the program would proceed to decision block 462 to determine whether or not this damage is from a postal process. If, the damage was from a postal process then the program would proceed to block 454 buffer new template images. Then the program would proceed to block 463. If, block 463 determined that the damage was not suspicious the program would proceed to decision block 452. If the damage was suspicious then the program would proceed to block 313 to add the record to the United States Postal Service suspicious damage report. If, decision block 463 determined that the image was not suspicious then the program would proceed to block 451 for the image buffer to route the image to an operator. Indicia print quality database 307 contains block 330 printing standards data, block 310 which lists additional record to 100% approved printed usage report, block 311 which adds the record to a partially approved printing usage report, block 312 which adds a record to the non approved printing usage report and block 313 which adds the record to the United States Postal Service suspicious damage report.

The above specification describes a new and improved system for printing information in a indicia or in the vicinity of the indicia that indicates the printer, printer settings, ink, or toner and paper in which the indicia was printed. It is realized that the above description may indicate to those skilled in the art additional ways in which the principles of this invention may be used without departing from the spirit. It is, therefore, intended that this invention be limited only by the scope of the appended claims.

What is claimed is:

1. An improved metering system that affixes an indicia to a mail piece, the improvement comprising: recording information relative to printing parameters of a printer that recorded the indicia on the mail piece, wherein the recorded information about the printer is the manufacturer of the printer, the model number of the printer and printer settings used to print the indicia; and wherein the recorded information is recorded in the indicia or in the vicinity of the indicia to provide evidence of the printer printing parameters used to record the indicia.

2. The system claimed in claim 1, further including recording information in a human-readable or machine-readable code in the indicia or in the vicinity of the indicia that indicates the type of paper in which the indicia was printed on.

3. The system claimed in claim 2, wherein the recorded information about the paper is printed in a human readable or machine readable code.

4. The system claimed in claim 2, further including a scanner that reads the recorded information about the paper.

5. The system claimed in claim 1, further including recording information in a human-readable, or machine-readable code in the indicia or in the vicinity of the indicia that indicates the type of ink, that was used to print the indicia.

6. The system claimed in claim 5, wherein the recorded information about the ink is printed in a human readable or machine readable code.

7. The system claimed in claim 6, further including a scanner that reads the recorded information about the paper.

8. The system claimed in claim 1, further including recording information in a human-readable or machine-readable code in the indicia or in the vicinity of the indicia that indicates the type of toner that was used to print the indicia.

9. The system claimed in claim 8, wherein the recorded information about the toner is printed in a human readable or machine readable code.

10. The system claimed in claim 9, further including a scanner that reads the recorded information about the toner.

11. The system claimed in claim 1, wherein the printer records the status of the printing parameters just prior to printing.

12. The system claimed in claim 11, wherein the printer records printing print quality information.

13. The system claimed in claim 1, wherein the printing parameters include information about supplies that the printer used to record the indicia.

14. A method for determining whether or not the indicia recorded on a mail piece has been recorded by a printer recognized by the Postal Service said method including the steps of:

a) recording information relative to characteristics of the printer that recorded the indicia in the indicia or in the vicinity of the indicia;

b) recording the manufacturer of the machine used to record the indicia on the indicia or in the vicinity of the indicia;

c) recording the model of the printer process used to record the indicia in the indicia or in the vicinity of the indicia;

d) reading the recorded information to determine whether or not the recorded information indicates that a printer recognized by the Postal Service recorded the indicia; and e) recording the machine settings used to record the indicia on the indicia or in the vicinity of the indicia.

15. The method claimed in claim 14, wherein the recording step further includes: recording information about the material that was used to record the indicia in the indicia or in the vicinity of the indicia.

16. The method claimed in claim 14, wherein the recording step further includes: printing information about the paper that was used to print the indicia in the indicia or in the vicinity of the indicia.

17. The method claimed in claim 14, wherein the recording step further includes: printing information about the ink that was used to print the indicia in the indicia or in the vicinity of the indicia.

18. The method claimed in claim 14, wherein the recording step further includes: printing information about the toner that was used to print the indicia in the indicia or in the vicinity of the indicia.

19. The method claimed in claim 18, wherein the recorded step further includes: recording the recorded information in a human readable code or machine readable code.

20. The method claimed in claim 14, further including: copying the recorded information for future reference.

21. The method claimed in claim 20, further including: transmitting the copied information for further study.

* * * * *